(12) United States Patent
Brosse et al.

(10) Patent No.: US 12,092,586 B2
(45) Date of Patent: Sep. 17, 2024

(54) APPARATUS AND METHOD FOR SIMULTANEOUSLY FOCUSING OPTICAL SYSTEMS ACCORDING TO THE DIAMETER OF THE CONTAINERS

(71) Applicant: TIAMA, Saint-Genis-Laval (FR)

(72) Inventors: Arnaud Brosse, Lyons (FR); Lubin Fayolle, Brignais (FR); Etienne Leprat, Sainte Foy les Lyon (FR)

(73) Assignee: TIAMA, Saint-Genis-Laval (FR)

( * ) Notice: Subject to any disclaimer, the term of this patent is extended or adjusted under 35 U.S.C. 154(b) by 0 days.

(21) Appl. No.: 17/922,020

(22) PCT Filed: Apr. 28, 2021

(86) PCT No.: PCT/FR2021/050736
§ 371 (c)(1),
(2) Date: Oct. 28, 2022

(87) PCT Pub. No.: WO2021/219959
PCT Pub. Date: Nov. 4, 2021

(65) Prior Publication Data
US 2023/0175977 A1    Jun. 8, 2023

(30) Foreign Application Priority Data
Apr. 30, 2020 (FR) ....................................... 2004296

(51) Int. Cl.
G01N 21/90 (2006.01)
(52) U.S. Cl.
CPC ..... *G01N 21/9009* (2013.01); *G01N 21/9036* (2013.01)

(58) Field of Classification Search
CPC .......... G01N 21/9009; G01N 21/9036; G01N 21/9045
(Continued)

(56) References Cited

U.S. PATENT DOCUMENTS

| 7,924,421 B2* | 4/2011 | Schmidt | ............. G01N 21/9081 250/223 B |
| 2016/0077020 A1* | 3/2016 | Leconte | ................ B07C 5/3408 356/239.4 |
| 2019/0168434 A1* | 6/2019 | Kubalek | ............. B29C 45/7686 |

FOREIGN PATENT DOCUMENTS

| DE | 102013204460 A1 * | 9/2014 | ............ B41J 3/4073 |
| EP | 1 553 405 | 7/2005 | |

(Continued)

*Primary Examiner* — Thanh Luu
*Assistant Examiner* — Mai Thi Ngoc Tran
(74) *Attorney, Agent, or Firm* — Clark & Brody LP (57) ABSTRACT

The invention relates to an installation for observing or illuminating a container (2) section (t) travelling in translation and each having an axis of revolution (S), the installation including optical systems (6₁) translationally guided along a parallel direction an adjustment portion of their respective optical paths, and which have, for containers having a section with a first diameter, their respective work volumes each coincident with a part of said container section having the first diameter, the installation including at least one driving device (15) providing, when the containers have a section with a second diameter different to the first diameter, the movement in synchronous translation of the optical systems along a direction parallel to the adjustment portion of their respective optical paths and as a function of the difference between the first and the second diameter.

18 Claims, 6 Drawing Sheets

(58) Field of Classification Search
USPC .......................... 250/223 B; 356/239.1, 240.1
See application file for complete search history.

(56) References Cited

FOREIGN PATENT DOCUMENTS

| | | |
|---|---|---|
| GB | 2 075 179 | 11/1981 |
| WO | 2014/177814 | 11/2014 |
| WO | 2018/051046 | 3/2018 |
| WO | 2020/261193 | 12/2020 |

* cited by examiner

APPARATUS AND METHOD FOR SIMULTANEOUSLY FOCUSING OPTICAL SYSTEMS ACCORDING TO THE DIAMETER OF THE CONTAINERS

TECHNICAL FIELD

The subject of the invention relates to the technical field of the observation and the analysis of optical singularities borne by glass containers, such as bottles, jars and vials.

PRIOR ART

The patent application WO 2014/177814 describes a new technique for observing and analyzing optical singularities borne on the surface or in the wall of a container, without rotating the container.

The term "optical singularities" refers to restricted portions of a container or of its surface having different properties from those in their vicinity or in the container. The term "optical singularities" therefore refers to portions of a container having different optical properties from those in their vicinity or in the container. In this case, these optical singularities mainly have an abnormal refractive and/or reflective effect by comparison with their vicinity. Refracting and/or reflecting defects, codes, or decorations of embossed type marking the surface of the containers are therefore optical singularities which deviate light differently from their vicinity either in terms of transmission (diopters) or specular reflection.

This patent application describes a device including a diffuse light source positioned to illuminate the outside of the container and exhibiting a variation in a property of the light along a direction of variation. This device includes a series of image-capturing devices placed around the travel path of the containers for observing each container from several views, making it possible to observe all or part of its periphery. Typically, these image-capturing devices are cameras equipped with their objectives. The shots from these views are processed in order to analyze optical singularities.

Of course, the focusing via the adjustment of the camera objectives is performed for a given diameter of the observed containers. In addition, when the diameter of the observed containers changes, it is necessary to focus all the cameras. This focusing requires access to each of the cameras to adjust the camera objectives. This operation is generally quite impractical and relatively lengthy since it requires the manual adjustment of each of the objectives, leading to a risk of operator error. In addition, there are no data sheets giving the adjustment to be made or even sufficiently precise gradations on focusing systems in general, which leads to a risk of poor repeatability. Finally, it must be possible to access each of the objectives, which is not always possible in practice.

A possible alternative is the motorization of the objectives. In this case, the solution is expensive, especially when the number of objectives is large. The motorization of each objective presupposes as many servo systems in order to guarantee the reproducibility of the adjustments.

There thus appears to be a need to be able to adjust the cameras more easily to each change in the diameter of the observed containers.

Moreover, it should be noted that the containers are made to travel translation past the cameras, generally using a conveyor belt on which the containers are placed at a random orientation with respect to their direction of translation. It follows that the optical singularities which are to be observed are borne on the surface or in the wall of the containers, such that these optical singularities can be present at any place on the periphery of the containers. It appears necessary for the cameras to be able to observe the entire periphery of the containers while allowing the containers to travel past the cameras.

Thus, the problem arises of how to position the image-capturing devices with respect to the path of circulation of the containers in such a way as to be able to observe the optical singularities borne at any location of the periphery of the containers while allowing ease of focusing of the image-capturing devices.

In the prior art, patent application GB 2 075 179 describes an apparatus for inspecting the side walls of empty bottles in order to detect foreign bodies such as mold or splash marks, liable to adhere to the walls of the bottles. This apparatus is suitable for inspecting bottles of different heights. This apparatus includes two inspection systems offset by 90° each including an illumination source disposed on one side of the conveyor belt transporting the bottles and a lower mirror located on the other side of the conveyor belt and suitable for vertically deflecting the beam toward a superimposed upper mirror which deflects the light in the direction of an array of photodiodes via a focusing lens. The upper mirrors, the focusing lenses and the photodiode arrays of the inspection systems are borne by a common support which is mounted to be moved vertically, such that the work distance between the bottle and the lens can be easily modified, thus making it possible to make the magnification of the lens appropriate to the height of the bottle. For a change of format, the work distance is modified and the focus is adjusted using, for example, a system of helical adjustment for focusing the lens.

Such a device has proven unsuitable for identifying an optical singularity borne on the surface or in the wall of bottles having different diameters. Specifically, for an optical singularity corresponding to a code, the size of the code to be inspected remains identical even if the diameter of the bottles varies. This apparatus modifies the size of the field and in particular the height of the field, by modification of the work distance, which has an adverse effect on the clarity of the detection. Moreover, such an apparatus requires adjustment of the focus after each change of bottle format. In addition, this system aims to inspect the bottles over their entire height such that the bottom of the field is maintained at the level of the conveyor belt, so that when there is a change in the size of the field related to a variation in the height of the bottles, it is not possible to adjust or maintain the height position of a possible inspection area.

SUMMARY OF THE INVENTION

The subject of the invention aims to overcome the drawbacks of the prior art by making provision for a new configuration of an installation designed to allow a positioning of optical systems with focusing distance such that the operation of focusing the optical systems is facilitated while allowing the observation or illumination of the containers over its entire periphery.

A subject of the invention is to make provision for an installation used to identify an optical singularity borne by a container section, on the surface or in the wall of the containers having different diameters, without changing the focusing when the diameter of the container section changes.

Another subject of the invention is to propose an installation making it possible to identify an optical singularity borne by a container section, on the surface or in the wall of the containers having different diameters, without changing the height dimension of the observed or illuminated container section, or the angle of observation or illumination when the diameter of the container section changes.

Another subject of the invention is to propose an installation making it possible to identify an optical singularity borne by a container section, on the surface or in the wall of the containers having different diameters, while adapting the height of the observed or illuminated container section independently of the diameters of the containers.

To achieve such an aim, the subject of the invention proposes an installation for observing or illuminating a container section bearing optical singularities on the surface or in the wall, the containers travelling past in translation and each having an axis of revolution, the installation including optical systems, each with a work volume located at a work distance and each having an optical path all the way to the container section contained in the work volume of the optical system.

According to the invention, the installation includes:
optical systems:
  having, for containers having a section with a first diameter, their respective work volumes each coincident with a part of said container section having the first diameter, each of these work volumes being at a given work distance;
  each possessing an optical path composed of at least one adjustment portion;
  being translationally guided along a direction parallel to the adjustment portion of their respective optical paths;
optical deflection devices placed on the optical paths of the optical systems, in such a way that these optical paths are split into at least:
direct optical paths located in radial planes of the container, between the container and the optical deflection devices and possessing angles of observation or illumination of identical values;
optical fold paths located between the optical deflection devices and the optical systems and corresponding to the adjustment portion of the optical paths;
at least one driving device providing, when the containers have a section with a second diameter different to the first diameter, the movement in synchronous translation of the optical systems along a direction parallel to the adjustment portion of their respective optical paths and as a function of the difference between the first and the second diameter such that the optical systems keep their invariable respective work distances and their respective work volumes are each coincident with a part of said container section having the second diameter.

Such an installation makes it possible to easily adjust the focusing of the optical systems to each change of diameter of the containers. Such an installation also benefits from the savings in space offered by the folding of the optical path using optical deflection devices to make all the folding portions of the optical paths parallel after reflection off these optical deflection devices.

In a preferred variant embodiment, the adjustment portions of the optical paths of the optical systems are parallel to one another and correspond to one and the same order number of the portion of the optical paths.

Advantageously, each optical system has an optical fold path contained in a radial plane containing the axis of revolution.

According to a feature of implementation, the installation includes a system for moving the optical systems and optical deflection devices along a direction parallel to the axis of revolution of the containers to adjust the height position of the container sections observed or illuminated by the optical systems.

According to an advantageous embodiment feature, the driving device includes a common frame supporting the optical systems which have adjustment portions of the respective optical path that are parallel to one another and to the direction of movement of this frame, the common frame being translationally driven by at least one actuator.

According to a preferred exemplary embodiment, the driving device includes optical-mechanical assemblies each composed of an optical system associated with its optical deflection device and of an individual guiding system providing a solely relative translation along the optical fold path, between the optical system and the associated optical deflection device, the optical systems being supported by at least a first common frame while the optical deflection devices are supported by at least a second common frame, at least one of the first and second common frames being translationally driven by at least one actuator.

Advantageously, the optical systems are supported by two first common frames disposed on either side of a translational travel path for the containers, while the optical deflection devices are supported by two common frames disposed on either side of the travel path, the first common frames and the second common frames being disposed in a superimposed position.

Preferably, each optical-mechanical assembly is equipped with removable attachment systems on the first common frame and the second common frame, the first common frame and the second common frame including adaptation fittings providing the mounting of the optical-mechanical assemblies in predefined positions distributed azimuthally around the axis of revolution.

According to an exemplary embodiment, the installation includes as adaptation fittings, on the one hand, a semi-circular rail attached to one of the common frames with which interact a number of rollers borne by each optical-mechanical assembly.

Moreover, the installation includes systems for locking each optical-mechanical assembly in a fixed position, in the predefined positions distributed in a semi-circle on the first common frame and on the second common frame.

To permit adjustments as a function of container size, the common frames are mounted on a support jig mounted movably along a direction parallel to the axis of revolution of the containers.

According to a first method of implementation of the invention, the optical systems are image-capturing optical systems each including at least one camera and at least one objective, and connected to at least one image-processing unit.

According to this first method of implementation of the invention, the installation includes an illumination source composed of illumination half-sources disposed on either side of the translational travel path for the containers, the illumination half-sources being preferably adjustable in relative separation and/or in height parallel to the axis of revolution.

According to another aspect of the invention, the installation includes cameras positioned to observe the entire periphery of the containers while allowing the containers to travel past the cameras.

To meet this need, the subject of the invention makes provision for an installation wherein the image-capturing optical systems include at least twelve cameras distributed in such a way that the twelve projections of the direct optical is paths located in a plane perpendicular to the axis of revolution, have with respect to the direction of travel, azimuth angles, respectively between [15°; 30°], [50°; 60°], [60°; 75°], [105°; 120°], [120°; 130°], [150°; 165°], [195°; 210°], [230°; 240°], [240°; 255°], [285°; 300°], [300°; 310°], [300°; 345°].

Another subject of the invention relates to an adjustment method for optical systems, each with a work volume located at a work distance and each having an optical path all the way to the container section contained in the work volume of the optical system, observing or illuminating a container section bearing optical singularities on the surface or in the wall, each having an axis of revolution and travelling past in translation, the method consisting in:

making available the optical systems which for containers possessing a section with a first diameter, have their respective work volumes each coincident with a part of said section having this first diameter, each of these work volumes being at a work distance which is fixed and remains invariable, the optical systems each possessing an optical path composed of at least one adjustment portion;

and during an adjusting phase for containers possessing a section with a second diameter different to the first diameter, moving the optical systems in synchronous translation along a direction parallel to the adjustment portion of the respective optical paths of each optical system and as a function of the difference between the first diameter and the second diameter of the container section such that the optical systems keep their invariable respective work distances and such that their respective work volumes each be coincident with a part of said container section having the second diameter.

According to a feature of implementation of the method, the optical systems are distributed azimuthally as a function of the diameter of the container section.

According to another feature of implementation of the method, the number of optical systems is chosen as a function of the diameter of the container section.

Typically, the method consists after each phase of adjustment of the optical systems and in an image-capturing phase and for each container travelling past in translation;

in illuminating at least the container section to be inspected;

in taking, by the optical systems, images covering the container section;

in analyzing the images taken to at least identify at least one optical singularity present in the container section.

DESCRIPTION OF THE EMBODIMENTS

As can be seen from the Figures, the subject of the invention relates to an installation 1 for observing or illuminating a glass container 2 possessing an axis of revolution S. According to a preferred exemplary embodiment, the container 2 is made to travel along a curvilinear trajectory or more simply still in translation along a direction of travel represented by the arrow fin such a way as to be able to be observed by the installation 1. Thus, the containers 2 are moved for example using a conveyor belt 3, to travel successively in front of the installation 1 which generally has a fixed jig 4 provided with means for observing or illuminating the containers 2.

The installation 1 also includes at least two optical systems $6_1$, $6_2$, . . . referred to by the generic reference $6i$ in the remainder of the description and which, within the meaning of the invention, each include a work distance. The work distance of the optical systems $6i$ is the distance separating them from their work volume Vt in the direction of observation or illumination. The work volume Vt is a volume at a distance from the optical systems $6i$ in which a part of the observed or illuminated container section must be placed for the observation or illumination to be optimal.

When the optical systems $6i$ are intended for observation, their work distance is the distance from a volume in which an observed container has a clear image. In other words, the work volume Vt corresponds to the field depth area Pf and the work distance is closed to the focusing or conjugation distance. Such optical systems $6i$ include at least one optical conjugation device between an object point and an image point. The work distance of the optical systems $6i$ can be fixed or adjustable.

In a preferred variant embodiment, the optical systems $6i$ are optical image-capturing systems each including a camera $7i$ and at least one objective $8i$ with or without focusing adjustment.

In another variant embodiment, the optical systems $6i$ are illuminating systems of projector type comprising at least one optical conjugation device used to project a light pattern at a given distance. For such illuminating optical systems, the illumination is optimal at a certain work distance, since their optical conjugation device conjugates an illumination source with the container to be illuminated.

The following description more specifically describes a preferred installation 1 implementing, as optical systems $6i$, image-capturing optical systems each including a camera $7i$ equipped with at least one objective $8i$. An installation 1 in accordance with the invention is particularly suitable for observing optical singularities borne on the surface or in the wall of the containers 2. By way of "optical singularities" provision may be made for observing and analyzing a code etched for example by laser or an embossment or decoration made by molding. According to another variant embodiment, the optical singularities are defects that must be detected. The installation 1 is suitable for observing optical singularities borne by the different parts of the containers, such as the neck, the base or the shoulder for example. According to this preferred application using cameras, the installation 1 includes an illumination source 9 for illuminating the outside of the container 3 and in particular the outer surface of the container that must be observed and liable to contain obtain optical singularities. Similarly, these cameras $7i$ are connected to at least one image-processing unit suitable for analyzing the images taken to at least identify an optical singularity present or borne by the containers.

Of course, the installation 1 may include as optical systems $6i$ a number of illumination systems with an optical conjugation device. Such an installation 1 makes it possible to illuminate containers using several illumination sources. The reader will easily be able to transpose the following description, in relation to the observation of the containers using cameras $7i$ equipped with objectives $8i$, to the illumination of the containers.

Figure 2:
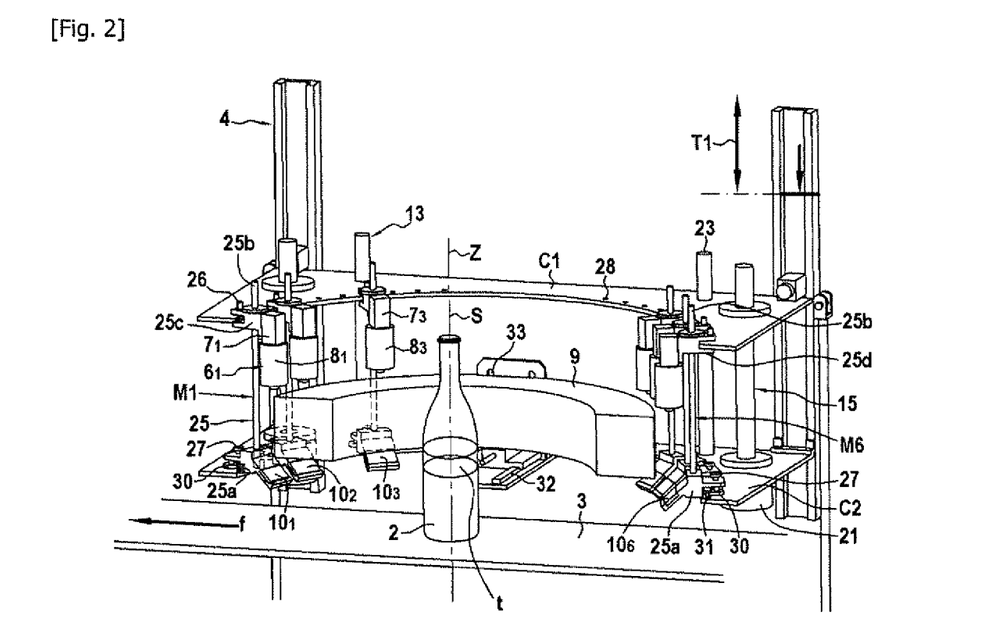
FIG. 2 is a perspective view taken substantially along the lines II-II of FIG. 1.

The installation 1 is suitable for observing using at least two cameras $7i$, all or part of a section t of the containers 2 travelling past in translation (FIG. 2). This container section t to be inspected corresponds to the part of the containers bearing the optical singularities on the surface or in the wall. The section t to be inspected of a container corresponds to the periphery or to the outer part of a container extending in an azimuthal plane A perpendicular to the axis of revolution S, namely a plane parallel to the plane of conveying of the containers defined by the conveyor belt 3. This container section t to be inspected extends along a given height taken along the axis of revolution S and limited with respect to the height of the container. In the case where the height dimension of the section t to be inspected, taken along the axis of symmetry S of the containers, corresponding to the height of a Datamatrix code to be observed, the code for example of sides measuring 1 cm×1 cm, the height of the section t will be of 1 cm, increased by a margin of tolerance, for example the inspected section measures 2 cm in height. For the sake of simplicity, the container section t to be inspected will be referred to in the remainder of the description as the container section. In other examples of use, the section t can for example correspond to the neck or to the collar of the container, and account for ½, ⅓, ¼, ⅕ or ¹/₁₀$^{th}$ of its total height.

The cameras $7i$ are positioned to observe different parts of the container section, with or without overlap between the observed parts. The number and disposition of the cameras $7i$ allow either a solely partial observation of the periphery of the section of a container, or, preferably, a complete observation of the section of the container, i.e. of the entire periphery of a section of the container. Thus, the installation 1 is particularly suitable for observing the entire periphery of a container section such as a section of the neck bearing optical singularities to be observed.

For the optical systems $6i$, there exists a direction of observation or illumination. To simplify the description, consider by way of example a camera $7i$ each including a linear or matrix image sensor and its objective $8i$ which define an optical axis which substantially corresponds to the axis of revolution of the objective, and connects the sensor to the observed region. The observed region is dimensioned along two directions corresponding to the two directions of a planar image, as a function of the work distance, the magnification and the dimension of the planar image, or of the dimension of the image sensor or of the used region of the image sensor, i.e. the field of observation. In addition, the work volume Vt of each optical system $6i$ has a third dimension in the direction of observation, which corresponds to the field depth Pf of the optical system. The field depth Pf is a known concept, it depends on the objective, the sensor, and the resolution requirement of the images according to the end purpose of measurement, reading or inspection.

By convention, each optical system $6i$ is connected to its work volume Vt by an optical path Li, and the length of the optical path Li is the work distance of the optical system $6i$. The optical path Li, if it is direct, is directed along the direction of observation. In the special case of an observation by means of a camera $7i$ and its objective $8i$ which define an optical axis, the path Li is carried by the optical axis, which is generally centered on the objective. It is of course possible to adapt the subject of the invention in the case where the direction of observation is not strictly the optical axis, for example if one is interested in an image portion which is not centered on the optical axis. There may therefore be a small deviation between the optical axis and the optical path under such conditions of observation. According to an advantageous embodiment, each camera $7i$ equipped with its objective $8i$ includes an optical path all the way to the container and directed toward the axis of revolution S to observe a portion of the container section, different from that observed by the other cameras.

It can be noted that the optical path of each optical system $6i$ has one or more portions according to the presence or otherwise of one or more optical deflection devices $10i$ disposed on the optical path between the container 2 and the camera. These optical deflection devices $10i$ encompass any optical component or assembly of optical components used to change the mean direction of a light beam without modification of the conjugation, while not preventing the transmission of an image and therefore the existence of a focusing distance. Preferably, the optical deflection devices $10i$ are planar metallic mirrors. It can be envisioned to embody the folding with other optical deflection devices, such as curved mirrors, prisms, semi-transparent plates or a combination of such systems.

The portion of the optical path between the container 2 and the first optical deflection device encountered is known as the direct optical path Ldi while the other portions are known as the optical fold paths Lri, with the addition of the index j related to the reference of the optical deflection device when the number of optical deflection devices $10i$ on the optical path is greater than 1. Moreover, a portion of the optical path of each optical system $6i$ is chosen to constitute a so-called adjustment portion denoted PR, the function of which will become more clearly apparent in the remainder of the description.

Figure 3:
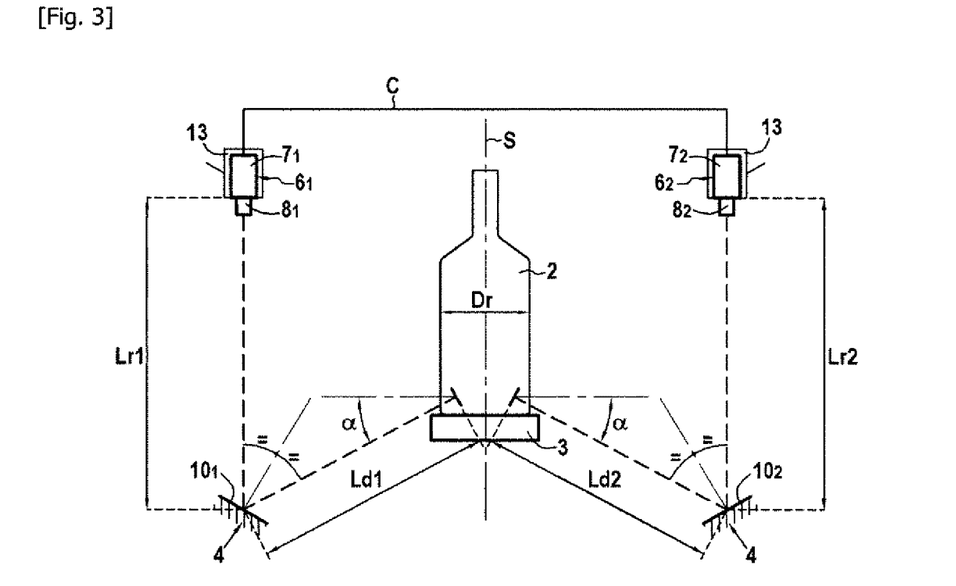
FIG. 3 is a schematic elevation view illustrating a preferred variant embodiment of art installation suitable for the observation of the container section having a reference diameter.
Figure 4:
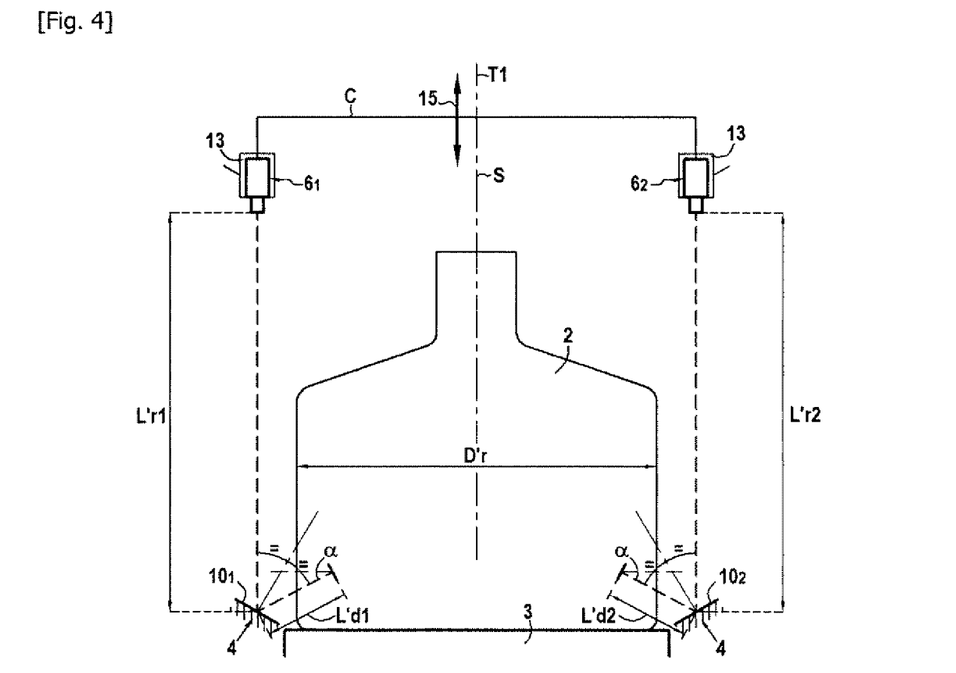
FIG. 4 is a similar view to FIG. 3 illustrating an installation suitable for the observation of the container section having a diameter greater than the reference diameter.

In a preferred variant embodiment illustrated in FIGS. 3 and 4, the direction of the optical path of each optical system $6i$ is modified between the camera and the container 2, by an optical deflection device $10i$ interposed between the container 2 and the camera. In this variant embodiment, each optical system $6_1$, $6_2$ includes a camera $7_1$, $7_2$, and an objective $8_1$, $8_2$ while an optical deflection device $10_1$, $10_2$ is interposed between the container 2 and each camera. In this case, the optical path L1, L2 (FIG. 3) or L'1, L'2 (FIG. 4) of each optical system $6_1$, $6_2$ is split into two portions, namely on the one hand, a first portion corresponding to the direct optical path Ld1, Ld2 (FIG. 3) or L'd1, L'd2 (FIG. 4) located between the container 2 and the optical deflection device $10_1$, $10_2$ and on the other hand, a second portion corresponding to the optical fold path Lr1, Lr2 (FIG. 3) or L'r1, L'r2 (FIG. 4) located between the optical deflection device $10_1$, $10_2$ and the camera $7_1$, $7_2$. Thus for the examples illustrated in FIGS. 3 and 4, the length of the optical path of each optical system $6_1$, $6_2$ corresponds to the cumulative distance of the optical deflection device and of the direct optical path, or respectively L1=Lr1+Ld1 and L2=Lr2+Ld2 for the FIG. 3 and L1=L'r1+L'd1 and L2=L'r2+L'd2 for the FIG. 4. One of the two portions of the optical path corresponds to the adjustment portion PR for the optical system. The choice of the adjustment portion PR will be explained in the remainder of the description.

Figure 6:
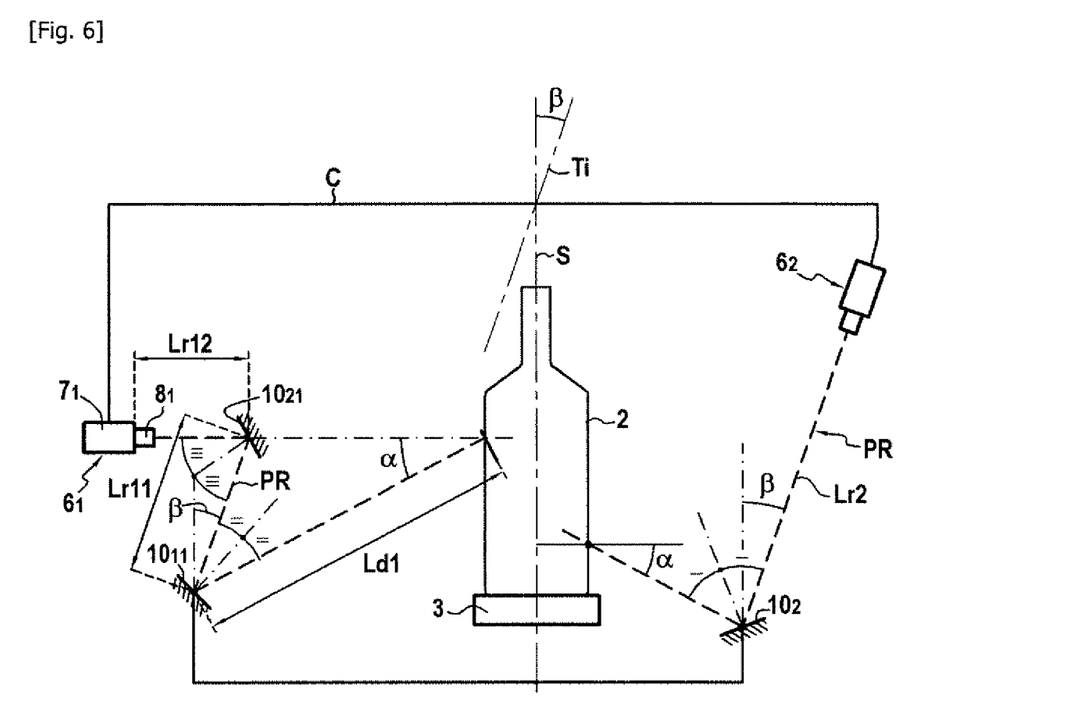
FIG. 6 is a schematic elevation view showing another example of configuration of an installation in accordance with the invention.

The left-hand part of FIG. 6 illustrates another variant embodiment wherein an optical system $6_1$ includes a camera $7_1$ equipped with its objective $8_1$, while a first optical deflection device $10_{11}$ directly precedes the container 2 on the optical path and a second optical deflection device $10_{21}$ is disposed between the objective $8_1$ and the first optical deflection device $10_{11}$. In this case, the optical path L1 is split into three portions, namely a first portion corresponding to the direct optical path Ld1 located between the container 2 and the first optical deflection device $10_{11}$, a second portion corresponding to the optical fold path Lr11 considered between the first optical deflection device $10_{11}$ and the second optical deflection device $10_{21}$ and a third portion corresponding to the optical path Lr12 between the second optical deflection device $10_{21}$ and the camera $7_1$. The length of the optical path of the optical system $6_1$ corresponds to the cumulative length of the three portions, i.e. L1=Ld1+Lr11+Lr12. One of the three portions of the optical path corresponds to the adjustment portion PR for the optical system. The choice of the adjustment portion PR will be explained in the remainder of the description.

By convention, the first portion of the optical path (or direct path) is considered between the container and the first optical deflection device encountered along the optical path while the last portion is considered between the optical system $6i$ and the optical deflection device directly preceding the optical system along the optical path. To each of these portions of optical path is allocated an order number which increases from the container toward the camera, namely first portion, second portion, third portion etc. Of course, the number of optical deflection devices disposed on the trajectory of the light between the optical system and the container can be different to the illustrated examples implementing one or two optical deflection devices.

According to a feature of the invention, each first portion of the optical path of the optical systems $6i$ is directed toward the axis of revolution S of the container extending in a radial plane containing the axis of revolution S. Each first portion of the optical path of the optical systems $6i$ delimits with respect to the normal to the axis of revolution S, a so-called observation angle (or illumination angle for illuminating optical systems) alpha $\alpha$. Advantageously, all the first portions of the optical paths of the optical systems $6i$ possess alpha angles of identical values as illustrated in the Figures.

In a preferred variant embodiment, the optical fold paths of the optical systems $6i$ are contained in a radial plane containing the axis of revolution S. in this variant, all the portions of the optical path of each optical system are contained in a radial plane containing the axis of revolution S.

According to a feature of the invention, each optical system $6i$ is translationally guided along a direction of translation Ti parallel to the adjustment portion PR of its optical path. For this purpose, the jig 4 of the installation 1 includes guiding systems 13 ensuring the translational guiding of the optical systems $6i$ along their direction of travel Ti. These guiding systems 13 can be embodied in any appropriate way using for example rails, columns, guides or sliders. According to an advantageous variant embodiment, the guiding systems 13 ensure a slider coupling by only allowing the translational movement of each optical system $6i$ with respect to the jig 4 of the installation. This variant embodiment is particularly advantageous due to the implementation of the optical deflection devices $10i$ as will be explained in detail in the remainder of the description.

According to another feature of the invention, the installation 1 includes a driving device 15 providing the synchronous translation of the optical systems $6i$, along a direction parallel to the adjustment portion PR of the optical path of each optical system $6i$. It must be understood that the driving device 15 is suitable for moving together or simultaneously all the optical systems $6i$ along one translation track. Each optical system $6i$ is translationally moved along a direction parallel to the adjustment portion PR of its respective optical path.

In accordance with the invention, the driving device 15 translationally moves the optical systems $6i$ along a given track which is a function of the variation of the diameters of the sections of the containers. Indeed, it is recalled that the use of optical systems $6i$ requires, to obtain a clear image, the taking into account of the optical path, i.e. the work distance between the optical system and the container 2. However, the installation 1 is made to observe containers with sections of different diameters.

Thus, it must be understood that the installation 1 must be adjusted or configured each time the diameter of the containers changes. Indeed, for containers having a given diameter known as the first diameter, the work volumes Vt of the optical systems $6i$ must each be coincident with a part of said container section having the first diameter, to obtain a clear enough image. Of course as already stated, each work volume Vt of an optical system $6i$ must be coincident with a part of said container section, considering that the work volumes of the optical systems contain different parts of the section of the container, with or without overlap. For this first diameter, each work volume Vt of the optical systems is at a given work distance along its optical path. In the same way, for containers having a given diameter called the second diameter, of a value different to the first diameter, the work volumes Vt of the optical systems $6i$ must each be coincident with a part of said container section having the second diameter, to obtain a clear enough image. In accordance with the invention, the work distance of each optical system which has been fixed for the observation (or illumination) of container sections having a first diameter remains invariable for the observation (or illumination) of container sections having a second diameter. In other words, the work distance of each optical system which is fixed for the observation (or illumination) of container sections having a given diameter is maintained for the observation (or illumination) of container sections having a different diameter.

Figure 5:
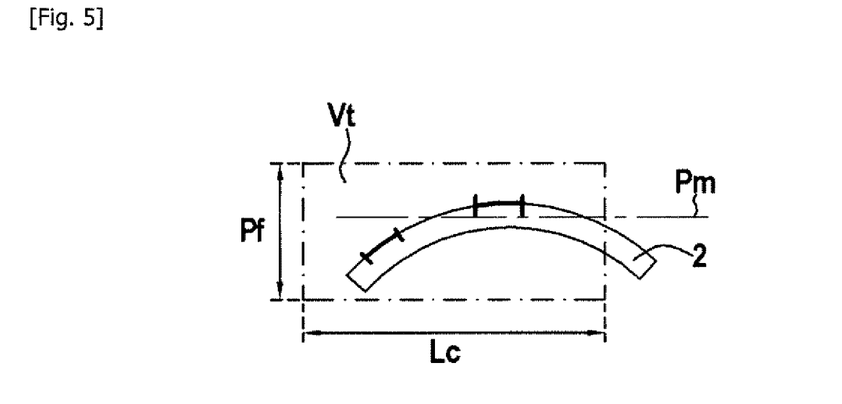
FIG. 5 is a detail view illustrating the focusing of the optical systems on containers.

Of course, at least an initial configuration phase is implemented for which all the optical systems $6i$ are adjusted to obtain a clear enough image for containers having a section with a given diameter. During this initial configuration phase, each objective Si of each camera $7i$ is adjusted to have a clear image of the part of the container section to be observed. In other words, the work volume Vt of each optical system contains the part of the inspected section such that the part of the inspected section is at a fixed work distance along its optical path. At the same time, the alpha angle α is fixed as a function of the desired observation or illumination conditions. For example all the optical systems are placed to observe a container of diameter Dr as illustrated in FIG. 3. When the conjugating devices are adjustable, such as objectives with focus rings, the initial configuration phase consists in also adjusting the conjugating device, thus determining the focusing distance and thus the work distance. As illustrated in FIG. 5, in the case of the reading of a code placed on the surface of the container 2, the point of aim is generally placed beyond the tangent to the container, on a focusing plane Pm. This FIG. 5 shows the minimal field depth Pf that must be tolerated by the optical system $6i$ to which must be added the tolerance on the position of the containers. The work volume Vt includes the curved shape of the cylindrical wall of the container on which the code is placed. Of course, this initial phase of configuration corresponds either to the first assembly of the optical systems, or to an adjustment for entry into service or maintenance of the optical systems, can be done on the basis of a theoretical container of zero diameter Dr by positioning the optical systems with respect to a central axis Z of the installation.

It should be noted that for reasons of comprehension, the optical paths and the work distances of the optical systems $6i$ are defined with respect to the container, i.e. with respect to the axis of revolution S of the container. It must be understood that this axis of revolution S is equivalent to the central axis Z of the installation when the container occupies, during its travel, a position for which its axis of revolution S is colinear with the central axis Z of the installation.

This initial configuration phase makes it possible, using the objectives of the optical systems $6i$, to perform an adjustment of the focusing distance for a container section possessing a given diameter. At the end of this initial adjusting phase, all the optical systems $6i$ each possess an optical path having a length or a work distance which has a fixed given value.

Thus, FIG. 3 illustrates by way of example an installation 1 including two optical systems $6_1$, $6_2$ for which the focusing, by each objective $7_1$, $7_2$, is performed to obtain a clear image of containers 2 possessing a section to be observed of a first diameter Dr. In the example illustrated in FIG. 3 and as explained above, the length of the optical path of the two optical systems $6_1$, $6_2$ corresponds to the cumulative distance of the optical fold path and of the direct optical path, or respectively L1=Lr1+Ld1 and L2=Lr2+Ld2.

Advantageously, the subject of the invention is particularly suitable for a peripheral observation by identical optical systems which thus all have the same focusing distance such that, given that the containers are cylindrical for the inspected section, the work distances are equal, with L1=L2.

According to a feature of the invention, the optical systems $6i$ possess at the end of the initial configuration phase, optical paths of a given length that remains invariable even if the installation is made to observe the container section possessing a different diameter to the diameter used for the adjustment. In other words, the same objectives $8i$ of the optical systems $6i$ are no longer used as focusing means for the observation of containers of different diameters.

When containers, the sections of which have a second diameter different to the first diameter, are to be observed by the installation 1, a phase of adjustment of the installation and in particular of the optical systems is performed for the observation of such containers. During this adjustment phase, the lengths of the optical paths of the optical systems $6i$ which were fixed during the initial configuration phase of the installation, are maintained. Consequently, the objectives $8i$ of the optical systems $6i$ are not touched at each of the successive phases of adjustment of the optical systems which are liable to be involved for sections of containers having different diameters. In practice, the adjustment of the installation is necessary when due to a change of diameter of the observed or illuminated container section, the respective work volumes are no longer each coincident with a part of said section. This obviously depends on the field depth of the optical systems. Typically, it is considered that containers possess sections of different diameters when the variation in diameter between two section diameters is greater than 10% of the field depth of the optical systems $6i$.

To nonetheless make a clear image of the container section having a second diameter different to a first diameter, the driving device 15 is controlled to move the optical systems $6i$ in synchronous translation along a direction parallel to the adjustment portion PR of each optical system and as a function of this difference between the first and second diameter in order to maintain the length of the optical paths. The synchronous movement of the optical systems 6 makes it possible to simultaneously adjust them. Thus, the distance of the focusing plane Pm with respect to the axis of revolution S of the container for all the optical systems $6i$ varies by a conjugate quantity as a function of the diameter of the container section. This movement track can also include the mode of observation of the containers, i.e. in transmission or in reflection. Specifically, the observation of one and the same diameter in transmission or in reflection can require focusing according to chords of different depths to minimize the problems of field depth since the incidence of maximal observation of a code for an observation in reflection mode can be greater than that for an observation in transmission mode.

It should be noted that according to the invention, the so-called observation (or illumination for illuminating optical systems) angle alpha α keeps the same value during the movement of the optical systems $6i$ in order to keep the length of the optical paths. According to the angle of observation and the shape of the conical or cylindrical containers, when the diameter of the container section changes, the maintaining of the height of the section observed along the axis of revolution S may require, at the same time as the adjustment by the translation of the optical systems along the adjustment portions PR, a vertical translation of the inspection device to maintain the section coincident with the work volumes of the optical systems. Typically, when the so-called observation or illumination angle alpha α is of zero value then the height of the section observed along the axis of revolution S may be maintained even if the diameter of the container section changes. In the case where the so-called observation or illumination angle alpha a is of non-zero value then the height of the section observed along the axis of revolution S is modified by vertical translation of the inspection device when the diameter of the container section changes, to keep the section coincident with the work volumes of the optical systems.

Advantageously, the installation includes a system for moving the optical systems $6i$ and optical deflection devices $10i$ along a direction parallel to the axis of revolution S of the containers thus making it possible to adjust the position of the container sections 2 observed or illuminated by the optical systems 6*i*. Thus, the optical systems 6*i* and the optical deflection devices 10*i* are mounted on the jig 4 by any known system or systems ensuring their movement along a direction parallel to the axis of revolution S of the containers.

FIG. 4 illustrates the observation of a container 2 having a section to be observed of greater diameter D'r than containers 2 possessing a section of diameter Dr illustrated in FIG. 3. For the observation of containers having a section of diameter D'r, the optical systems $6_1$, $6_2$ are moved with respect to their positions illustrated in FIG. 3, synchronously by the driving device 15 of a track which is a function of the difference of the diameters (D'r−Dr). Thus, the lengths L'r1+L'd1 and L'r2+L'd2 of the optical paths of the optical systems $6_1$, $6_2$ during the inspection of the containers of diameter D'r is equal to the lengths, respectively, Lr1+Ld1 and Lr2+Ld2 of the optical paths of the optical systems $6_1$, $6_2$ during the inspection of the containers of reference diameter Dr. Thus, Lr1+Ld1=L'r1+L'd1 and Lr2+Ld2=L'r2+L'd2.

It must be considered that the driving device 15 can be embodied in different ways and depends in particular on the direction of the portion or portions of the optical path but also on the direction of the adjustment portions parallel to which the optical systems 6*i* are moved.

Figure 8A:
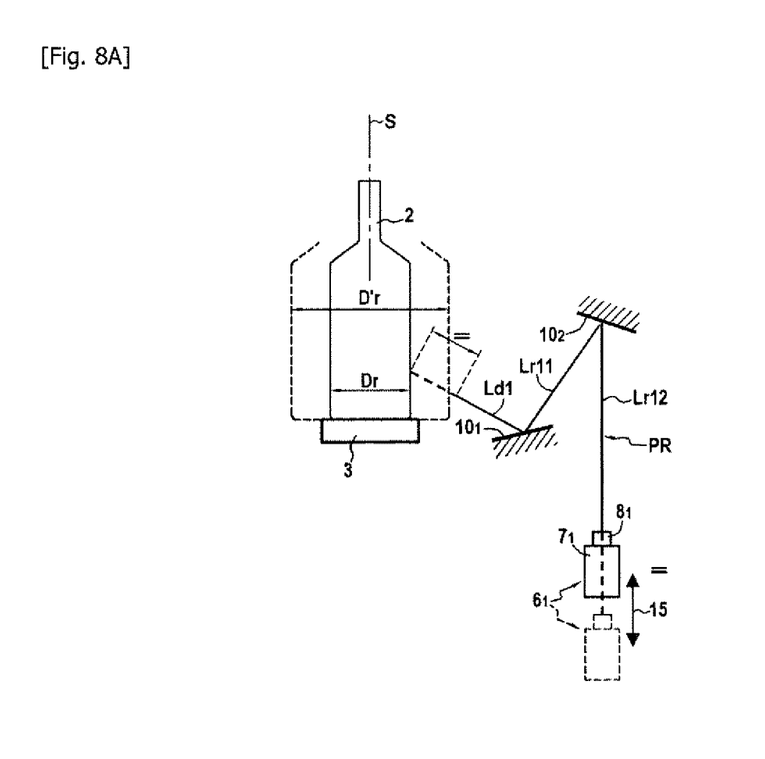
FIG. 8A is a schematic view illustrating the principle of movement of the optical systems when the chosen adjustment portion is the third portion of the optical path.
Figure 8B:
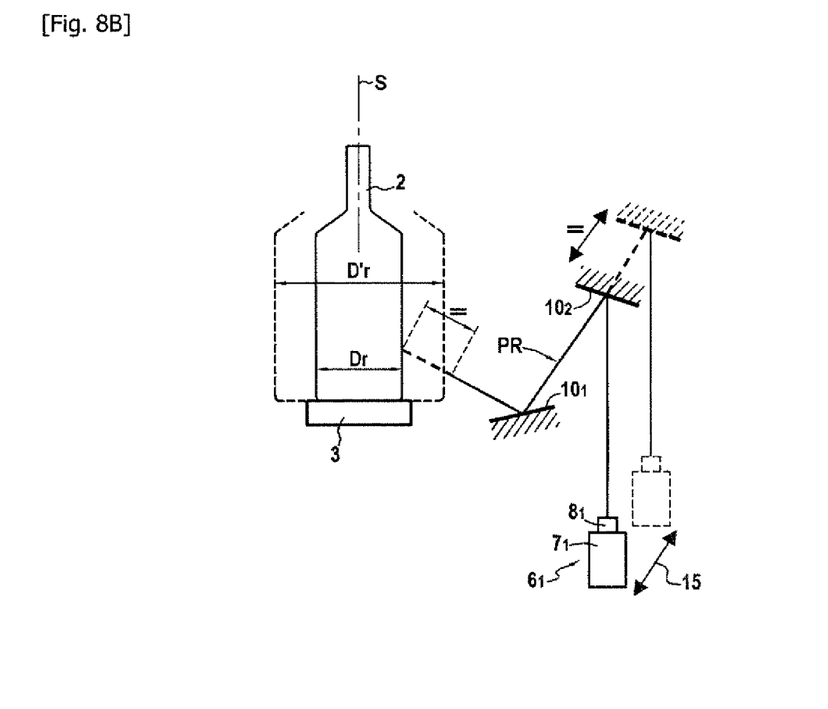
FIG. 8B is a schematic view illustrating the principle of movement of the optical systems when the chosen adjustment portion is the second portion of the optical path.
Figure 8C:
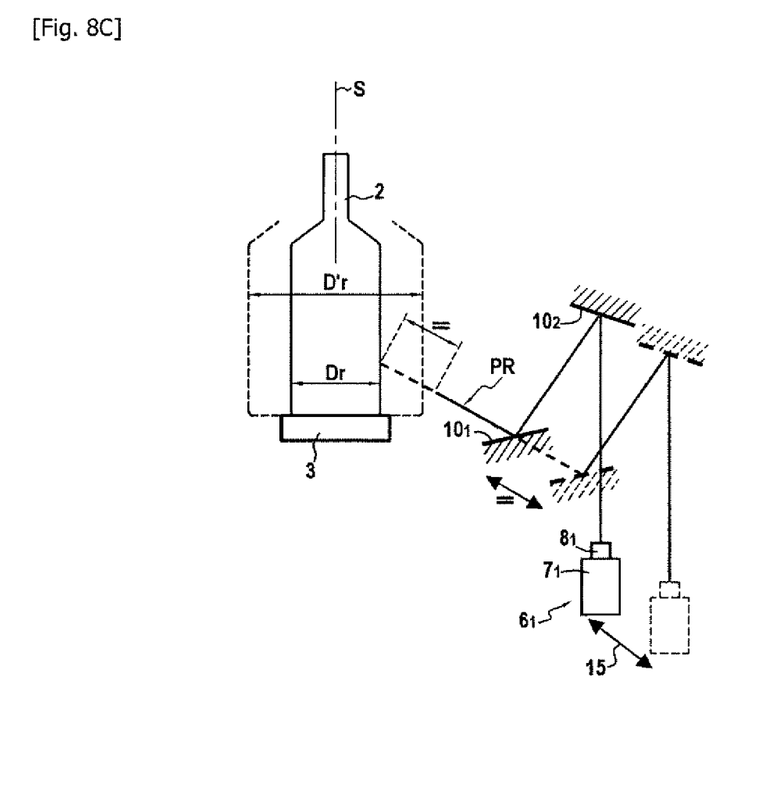
FIG. 8C is a schematic view illustrating the principle of movement of the optical systems when the chosen adjustment portion is the first portion of the optical path.

Advantageously, the choice of the adjustment portion is dictated by the simplicity to embody the driving device 15. FIGS. 8A to 8C illustrate the different configurations of the driving device 15 as a function of the choice of the adjustment portion PR of the optical path. FIG. 8A illustrates a variant for which the optical path L1 is split into three portions namely, a first portion corresponding to the direct optical path Ld1 located between the container 2 and the first optical deflection device $10_1$, a second portion corresponding to the optical fold path Lr11 considered between the first optical deflection device $10_1$ and a second optical deflection device $10_2$ and a third portion corresponding to the optical path Lr12 between the second optical deflection device $10_2$ and the optical system $6_1$.

According to the example illustrated in FIG. 8A, the third portion of the optical path is chosen as the adjustment portion PR for the optical system $6_1$. For the observation of containers, the diameter of which goes from a first diameter Dr to a second diameter D'r, the moving device 15 ensures the movement of the optical system $6_1$ along a direction parallel to the third portion of the optical path optical system $6_1$. According to this example, the moving device 15 provides the translation of the optical system $6_1$, along a direction parallel to this third portion and parallel to the axis of revolution S. According to the example illustrated in FIG. 8B, the second portion of the optical path is chosen as the adjustment portion PR for the optical system $6_1$. For the observation of a container with a different section diameter, the moving device 15 moves the optical system $6_1$, jointly with the second optical deflection device $10_2$ along a direction parallel to the second portion of the optical path of optical system $6_1$. According to this example, the moving device 15 moves the optical system $6_1$ and the second optical deflection device $10_2$ along a direction not parallel to the axis of revolution S. Similarly, according to the example illustrated in FIG. 8C, the first portion of the optical path is chosen as the adjustment portion PR for the optical system $6_1$. For the observation of a container with a different section diameter, the moving device 15 moves the optical system $6_1$ and the first and second optical deflection devices $10_1$, $10_2$, along a direction parallel to the first portion of the optical path optical system $6_1$. According to this example, the moving device 15 moves the optical system $6_1$ and first and second optical deflection devices $10_1$, $10_2$ along a direction not parallel to the axis of revolution S.

It is apparent from this example that for reasons of simplicity of embodiment of the moving device 15 and overall dimensions of the installation, preferably the second and last portion of the optical path will be chosen as the adjustment portion for all the optical systems as illustrated in the examples illustrated in FIGS. 3, 4 and 6, wherein provision is made for a single optical deflection device. One can note that in these situations, the adjustment is obtained by moving the optical systems 6*i* in relation to the optical deflection devices 10*i*. In a variant of the invention, provision is made for the possibility of moving either the optical systems or the optical deflection devices. Provision is also made for moving the assembly in order to position or maintain the inspected or observed section along the axis of revolution S.

According to an advantageous embodiment feature, the adjustment portions PR of the optical paths of the optical systems 6*i* are parallel to one another and correspond to one and the same order number of optical path portion. Thus, for example, the last portions of the optical paths are chosen as the adjustment portions for all the optical systems 6*i*. According to an advantageous embodiment feature, the adjustment portions PR of the optical paths of the optical systems 6*i* are all parallel to one another and to the axis of revolution S making it possible to save space as regards the installation and gain simplicity as regards the moving device 15.

In the same way, the driving device 15 can be embodied in different ways and depends in particular on the directions relating to the adjustment portions for the optical systems.

Figure 7A:
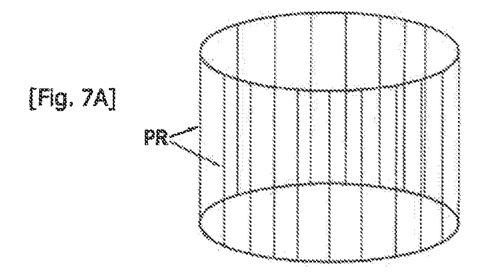
FIGS. 7A, 7B and 7C are schematic views illustrating various configurations of the adjustment portions of the optical paths setting themselves up respectively along the generators of a cylinder, along the outer surface of a conical frustrum and in a helix.

In the example illustrated in FIG. 7A, the optical systems 6*i* are positioned such that all the adjustment portions PR are parallel to one another. In a preferred variant embodiment, the driving device 15 may include a common frame or an undeformable solid supporting the optical systems 6*i*. This frame can translationally driven using at least one actuator, along a direction of movement parallel to the adjustment portions PR making it possible to simultaneously translate all the cameras of the same distance with respect to the axis of revolution of the container, leading to the simultaneous focusing of the optical systems 6*i*. The actuator can be single.

For example, as illustrated in FIG. 6, all the optical systems 6*i* are supported by a common frame C. If the second portion corresponding to the first fold portion is the adjustment portion PR chosen for each optical system $6_1$, $6_2$, then each optical system $6_1$, $6_2$ is translated along a direction of translation T1 parallel to the optical fold paths Lr11 and Lr2, respectively located between the first and second optical deflection devices $10_{11}$ and $10_{21}$ and between the first optical deflection device $10_1$ and the optical system $6_2$. The direction of movement of the common frame C makes an angle beta β with respect to the axis of revolution S.

According to an advantageous feature, all the adjustment portions PR are parallel to the axis of revolution S of the containers (beta=0). The preferred direction of folding of the optical path is thus parallel to the axis of revolution S which is vertical, ensuring a vertical translation of the optical systems 6*i*. Thus, as illustrated in FIGS. 3 and 4, all the optical systems 6*i* are supported by a common frame C and the adjustment portions PR are the second portions of the optical path which are all parallel to one another and to the axis of revolution S. The common frame C is moved along a direction of displacement T1 which is parallel to the axis of revolution S and to each of the second portions of the optical path of the optical systems.

Figure 7B:
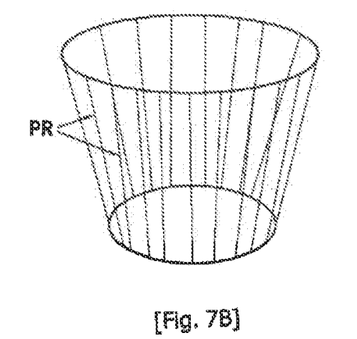
Figure 7C:
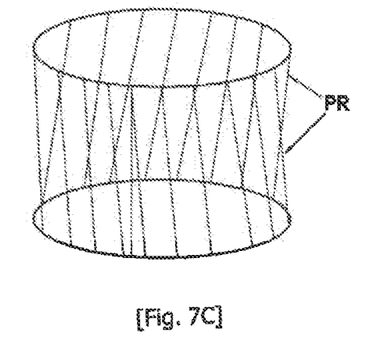

In the example illustrated in FIG. 7B, the optical systems 6$i$ are positioned such that all the adjustment portions PR are positioned on the outer surface of a cone. In the example illustrated in FIG. 7C, the optical systems 6$i$ are positioned such that all the adjustment portions PR are positioned along the segments of the same length connecting two parallel circles of the same diameter, i.e. in a hyperboloid. In these variant embodiments, all the optical systems 6$i$ can be attached to an undeformable solid which is not moved in the same direction as the optical systems 6$i$. These optical systems 6$i$ are translationally guided parallel to the adjustment portions PR, themselves non-parallel to the axis of revolution S. The undeformable driving solid translates parallel to the axis of revolution S. The guiding translation can thus be decomposed into a component parallel to the direction of translation of the solid, and thus parallel to the axis of revolution S, and a second component. It suffices that the translation of the driving solid drives the movement parallel to the axis of revolution S, without preventing the movement along the other component, so that under the effect of the guiding, the resulting movement is parallel to the adjustment portions PR. The technique is therefore thus easily adaptable, particularly by making provision for appropriate guiding, degrees of freedom and mechanical clearances, to adjustment portions that are non-parallel to one another and non-parallel to the axis of revolution 5, but the solution according to FIG. 7A appears simpler. The translation of the solid leads to the simultaneous translation of all the optical systems 6$i$ with an identical track.

It should be noted that the optical systems 6$i$ may be positioned such that the adjustment portions are in different directions, with however a limited angle around a cylinder. In this case, the undeformable solid can be replaced by actuators such as drawn cables or actuators which can easily provide synchronous translations to the optical systems 6$i$, each translationally moved along a direction parallel to its adjustment portion.

According to an advantageous embodiment feature, the installation 1 includes a control system, not shown, making it possible to control the driving device 15 in such a way that the latter can move the optical systems 6$i$ in synchronous translation along a determined track. This control system can be embodied in any appropriate way such as in the form of an automatic controller or a manual controller.

Figure 1:
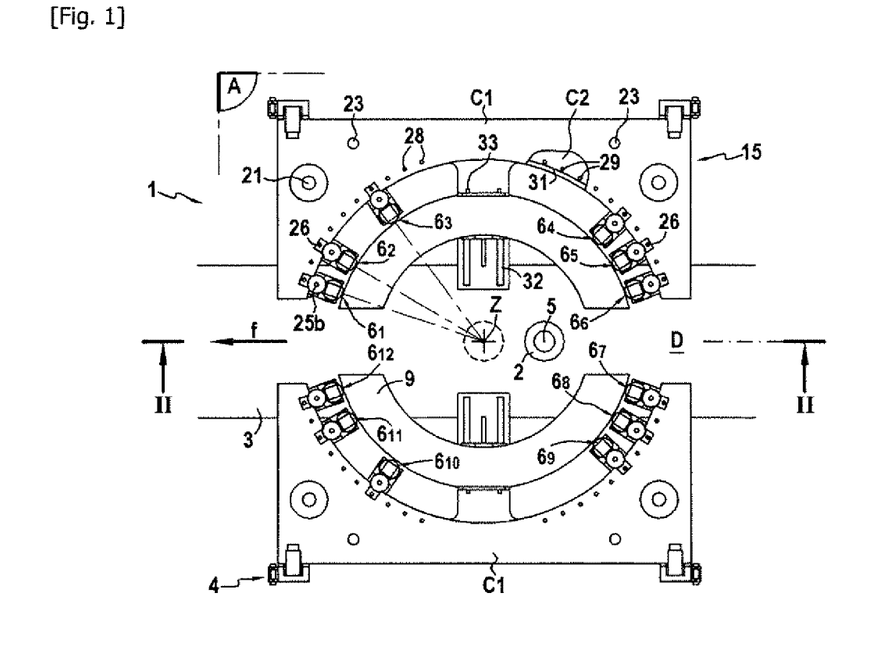
FIG. 1 is a top view of an exemplary embodiment of an installation in accordance with the invention.

FIGS. 1 and 2 illustrate an embodiment of an installation 1 implementing the features of the invention, the principle of which is described by FIGS. 3 and 4. According to this embodiment, the installation 1 includes optical systems 6$i$ each possessing an optical path on which is placed a single optical deflection device 10$i$. Each optical path is thus split, as explained, into a direct optical path and into an optical fold path considered as the adjustment portion. All the optical fold paths are parallel to one another and parallel to the axis of revolution S. The optical systems 6$i$ are moved by the driving system 15 along a direction T1 parallel to the optical fold paths and to the axis of revolution S.

In the illustrated exemplary embodiment, the optical systems 6$i$ are distributed on either side of a translational travel path D for the containers 2. The driving device 15 thus includes two half-assemblies disposed on either side of the travelling path D. In each half-assembly, the optical systems 6$i$ are supported by a first common frame C1 while the optical deflection devices 10$i$ are supported by a second common frame C2. Each first common frame C1 is embodied by a plate and each second common frame C2 is embodied by a plate. In each half-assembly, each first common frame C1 is disposed in a position of superposition with respect to a second common frame C2.

At least one actuator 21 provides a relative translation between the first common frame C1 and the second common frame C2 along the direction of displacement T1. Preferably, for each half-assembly, the first common frame C1 and the second common frame C2 in the superimposed position are translationally guided by guiding columns 23. Actuators 21 such as jacks or worm screw systems translate each first common frame C1 with respect to the second common frame C2 along the direction of movement T1. In the illustrated example, the actuators 21 translate the first common frame C1 with respect to the second common frame C2 which remains fixed in relation to the first common frame.

In the illustrated example, the optical systems 6$i$ are supported by two half-assemblies disposed on either side of the translational travel path D for the containers 2. It should be noted that the installation can include a single half-assembly.

According to an advantageous embodiment feature, the common frames C1, C2 are mounted on the support jig 4 in such a way as to be movable along a direction parallel to the axis of revolution S of the containers. Such a mounting ensures the adaptation of the installation with respect to the conveyor belt 3 making it possible to adjust the position of the observation area of the optical systems. Where applicable, the observation half-assemblies are mounted on the frame 4 with the possibility of adjusting their relative separation along a direction perpendicular to the direction of travel f. It is thus possible to adjust their relative separation as a function of the diameter of the containers 2.

According to an advantageous embodiment feature, the driving device 15 includes optical-mechanical assemblies Mi each composed of an optical system 6$i$ associated with its optical deflection device 10$i$ and an individual guiding system 25 providing a solely relative translation along the optical fold path, between the optical system 6$i$ and the associated optical deflection device 10$i$. According to an advantageous feature of the invention, each optical-mechanical assembly Mi is equipped with removable systems 26, 27 for attaching to the first common frame C1 and the second common frame C2.

It must be considered that each optical-mechanical assembly Mi constitutes a unit assembly which can, using the removable attaching systems 26, 27, be mounted, moved or removed easily on the common frames. As will be seen more accurately from the exemplary embodiment illustrated in FIGS. 1 and 2, each individual guiding system 25 of a optical-mechanical assembly Mi includes, for example, a base 25$a$ to which is attached an optical deflection device 10$i$ and from which rises a guiding rod 25$b$ on which is mounted a support 25$c$ to which the optical system 6$i$ and more precisely the camera 7$i$ is attached. The support 25$c$ is mounted slidably on the guiding rod 25$b$ to solely provide a translation in relation to the base 25$a$ along the optical fold path. For this purpose, the guiding rod 25$b$ includes, for example, a groove extending parallel to its axis and interacting with a nipple borne by the sliding support 25$c$.

Of course, the individual guiding systems 25 of the optical-mechanical assemblies Mi can be embodied differently, in the form of rails for example. Each individual guiding system 25 makes it possible to keep the direction of the optical path in a radial plane containing the axis of revolution despite the sliding movements along the optical fold path, of the optical system 6i with respect to the optical deflection device 10i.

The supports 25c of the optical systems 6i are slidably displaced by the first common frames C1. For this purpose, each support 25c of the optical systems 6i is provided with a yoke 25d between the branches of which a first common frame C1 is inserted. The supports 25c of the optical systems 6i are attached to the first common frames C1 using the removable attaching systems 26 which can be embodied in any appropriate way such as for example by screwing or as in the illustrated example, by a removable interlocking coupling. In the illustrated example, each support 25c of a optical-mechanical assembly Mi is provided with a locking pin 26 intended to be inserted into a complementary housing 28 fashioned in the first common frames C1. It can be noted that each optical-mechanical assembly Mi for which the camera is translationally guided, is mounted by a pivot coupling on the common frames C1 to avoid a hyperstatic assembly by the linear guidance between the first frame and the second frame, by the guiding columns 23.

In the same way, the bases 25a of the optical deflection devices 10i are attached to the second common frames C2 using the removable attaching systems 27 which can be embodied in any appropriate manner such as for example by screwing or as in the illustrated example, by a removable interlocking coupling. In the illustrated example, each base 25a of a optical-mechanical assembly Mi is provided with a locking pin 27 intended to be inserted into a complementary housing 29 fashioned in the second common frames C2. Of course, each housing 29 fashioned in a second common frame C2 is embodied in a relationship of superposition with a housing 28 fashioned in a first common frame C1 in such a way that the individual guiding systems 25 are parallel to one another and parallel to the guiding columns 23. Preferably, the housings 28, 29 are fashioned on each common frame, in positions distributed, regularly or not, according to a semi-circle.

Preferably, each base 25a of a optical-mechanical assembly Mi is also provided with a pair of rollers 30 interacting with a semi-circular rail 31 attached to each second common frame C2. Each base 25a can thus be positioned in a precise stable position while being able to be easily moved in the azimuthal plane A.

Thus, the first common frame C1 and the second common frame C2 include via the rail 31, the locking pins 26, 27 and housings 28, 29, adaptation fittings ensuring the mounting of the optical-mechanical assemblies Mi in predefined positions distributed azimuthally around the axis of revolution S. These adaptation fittings thus include, on the one hand, a semi-circular rail 31 attached to a common frame with which interact a number of rollers 30 borne by each optical-mechanical assembly and, on the other hand, locking systems 26, 27 in a fixed position of each optical-mechanical assembly, in predefined positions distributed in a semi-circle on the first common frame and on the second common frame.

In a variant embodiment, the image-capturing optical systems include at least twelve cameras 7i distributed in such a way that the twelve projections of the direct optical paths located in a plane perpendicular to the axis of the projection S, have in relation to the direction of travel f, azimuth angles respectively contained in the angular intervals [15°; 30°], [50°; 60°], [60°; 75°], [105°; 120°], [120°; 130°], [150°; 165°], [195°; 210°], [230°; 240°], [240°; 255°], [285°; 300°], [300°; 310°], [300°; 345°].

Of course, the installation 1 can include a different number of optical systems 6i. Specifically, the number of the optical systems 6i is chosen as a function of the diameter of the container section. Similarly, the azimuthal distribution of the optical systems 6i is a function of the diameter of the container section under consideration, the spacing between the sections of two consecutive containers and the width of the angular sector of the container section which may be inspected by each optical system 6i as a function of the azimuth at which it might be placed. The width of the angular sector of the container section that may be inspected by each optical system 6i as a function of the azimuth at which it might be placed itself depends on the choices of the illumination and observation modes of the containers. For example, it generally differs according to whether the container is observed in transmission mode or in reflection mode with a given light source.

The initial configuration phase, during which the work distances of each optical system are predefined, can include a step during which each optical-mechanical assembly Mi is assembled, aligned and the work distances of the optical systems adjusted, positioning the work volume at a given distance from the optical deflection device for a given position of the optical systems along the guiding rail, at a given distance from the optical deflection devices.

According to the invention, a optical-mechanical assembly Mi can be added (mounted), removed (dismounted) or moved in the installation while keeping a position of its work volume positioned on a container section of the same diameter as for the other optical-mechanical assemblies.

According to the examples illustrated in FIGS. 1 and 2, the installation 1 includes an illumination source composed of illumination half-sources 9 disposed on either side of the translational travel path D for the containers. For example, each half-source 9 extends in a semi-circle above the optical deflection devices 10i while being supported by a second frame C2. The illumination half-sources 9 are preferably adjustable in relative separation and/or in height taken parallel to the axis of revolution S and with respect to the second frame C2. Each illumination half-source 9 is mounted on sliders 32, the sliding direction of which is perpendicular to the direction of travel and/or on sliders 33, the sliding direction of which is parallel to the axis of revolution S. Preferably, the illumination source has the features of the source described in the patent application WO 2014/177814.

It results from the preceding description that the subject of the invention also relates to a method of adjustment for optical systems 6i observing or illuminating a container section 2 travelling past in translation and each having an axis of revolution S. This method consists in:

making available the optical systems which for containers 2 possessing a section with a first diameter, have their respective work volumes each coincident with a part of said section having this first diameter, each of these work volumes being at a given work distance which is fixed and remains invariable, the optical systems each possessing an optical path composed of at least one adjustment portion PR;

and during an adjusting phase for containers 2 possessing a section with a second diameter different to the first diameter, in moving the optical systems 6i in synchronous translation along a direction Ti parallel to the adjustment portion PR of the respective optical paths of each optical system and as a function of the difference between the first diameter and the second diameter of the container section such that the optical systems keep their respective invariable work distances and that their respective work volumes are each coincident with a part of said container section having the second diameter.

This method thus aims to provide an initial phase of configuration of the optical systems for a section of a container with a given diameter, using the system for focusing the optical systems. At each change of diameter of the container section, a new phase of adjustment of the optical systems is performed without using a system for modifying the focusing distance of the optical systems 6i.

Advantageously, the optical systems 6i are distributed on the azimuth as a function of the diameter of the container section.

In addition, the number of the optical systems 6i is chosen as a function of the diameter of the container section.

After each adjusting phase, just as after the initial phase of configuration of the optical systems, the method consists in an image-capturing phase and for each container 2 traveling in translation:

in illuminating at least the container section to be inspected by an illumination source 9;
in taking, by the optical systems 6i, images covering the container section;
and in analyzing the images taken to at least identify at least one optical singularity present in the container section.

The invention allows the observation of optical singularities located on sections of containers of different diameters. In particular, the invention allows the reading of identification codes etched on the surface of the containers and placed either on the body or on the neck of a diameter less than that of the so body. Specifically, according to the models of containers, as a function of the needs of the bottling companies, the codes are positioned on the neck or on the body. The invention therefore gives an online reading device the ability to adapt to any model of container. The invention can advantageously be combined with the patent application WO 2014/177814 to also adapt to dark or light hues of glass.

According to the invention, the acceptable diameters of the container sections are an interval [Ømin; Ømax], which in particular depends on the work distances and the length of the adjustment portions PR.

The invention has been described here by way of example for the observation of singularities on the surface of the containers, the optical systems 6i being observation systems, for example cameras, and the invention makes it possible to place the work volume of the optical systems to contain the surface bearing the singularities. It has been specified that in this special case the work volume contains the object plane conjugated with the image sensor of the cameras, and that the object plane is optionally positioned slightly further than the surface bearing the singularities, in order to take into account the curvature of the cylindrical surface of the container in the place of the inspected section. It is of course easily possible to adapt the invention to observe the inside of the containers, by moving the inspection volume still further away.

It should also be noted that the field depth Pf of the conjugation systems which determine the work distance of the optical systems 6i, can be more or less great, for example between 1 mm and 2 cm, and therefore the work volume more or less deep, this depth being its dimension in the direction of observation, therefore in the direction of the direct portion of the optical path Li. This field depth determines the precision with which the work volume must be positioned, and therefore the difference in diameter above which an adjustment by means of the driving device is necessary.

In a similar way to what has already been described, the subject of the invention simplifies the positioning and adjustment of the optical illumination systems with a work distance to illuminate sections of containers of different diameters.

The invention claimed is:

1. An installation for observing or illuminating a container section (2) bearing optical singularities on a surface or in a wall, containers each having the container section travelling in translation and each having an axis of revolution (S), the installation including:

optical systems (6i), each with a work volume located at a work distance and each having an optical path all the way to the container section contained in the work volume of each of the optical systems, the optical systems (6i):
having, for the containers having a section with a first diameter, respective work volumes thereof each coincident with a part of the container section having the first diameter, each of the work volumes being at a given work distance;
each optical system possessing an optical path composed of at least one adjustment portion (PR);
each optical system being translationally guided along a direction parallel to the at least one adjustment portion (PR) of the optical path thereof;
an optical deflection device (10i) placed on each optical path on each optical system, in such a way that each optical path is divided into at least:
direct optical paths located in radial planes of the containers, between each container (2) and each optical deflection device (10i), each direct optical path possessing identical angles of observation or illumination of identical values;
optical fold paths located between the optical deflection devices (10i) and the optical systems (6i) and corresponding to the at least one adjustment portion (PR) of the optical paths; and
at least one driving device (15) providing, when containers each have a section with a second diameter different to the first diameter, movement in synchronous translation of the optical systems (6i) along a direction parallel to the at least one adjustment portion of their respective optical paths and as a function of a difference between the first and the second diameter, the optical systems keeping their invariable respective work distances and their respective work volumes being each coincident with a part of the container section having the second diameter.

2. The installation according to claim 1, wherein the at least one adjustment portions (PR) of the optical paths of the optical systems (6i) are parallel to each other and correspond to the same order number for the optical paths.

3. The installation according to claim 1, wherein the optical fold of each optical system is contained in a radial plane containing the axis of revolution (S).

4. The installation according to claim 1, wherein the installation includes a system for moving the optical systems (6i) and optical deflection devices (10i) along a direction parallel to the axis of revolution (S) of the containers to adjust a height position of the container sections (2) observed or illuminated by the optical systems (6i).

5. The installation according to claim 1, wherein the driving device (15) includes a common frame (C, C1, C2)

supporting the optical systems (6*i*) which have the at least one adjustment portions (PR) of the respective optical path that are parallel to one another and to the direction of movement of this frame, the common frame being translationally driven by at least one actuator (21).

6. The installation according to claim 5, wherein the driving device (15) includes optical-mechanical assemblies (Mi), each composed of one of the optical systems (6*i*) associated with the optical deflection device (10*i*) thereof and an individual guiding system (25) providing a solely relative translation along the optical fold path, between the optical system (6*i*) and an associated optical deflection device (10*i*), the driving device (15) including a first common frame (C1) and a second common frame (C2), the optical systems (6*i*) being supported by at least the first common frame (C1) while the optical deflection devices (10*i*) are supported by at least the second common frame (C2), at least one of the first and second common frames being translationally driven by the at least one actuator (21).

7. The installation according to claim 6, wherein the optical systems (6*i*) are supported by two first common frames (C1) disposed on either side of a translational travel path (D) for the containers, while the optical deflection devices (10*i*) are supported by two common frames (C2) disposed on either side of the translational travel path (D), the first common frames (C1) and the second common frames (C2) being disposed in a superimposed position.

8. The installation according to claim 6, wherein each optical-mechanical assembly (Mi) is equipped with removable attachment systems on the first common frame and the second common frame, the first common frame and the second common frame including adaptation fittings (26-28; 27-29) providing mounting of the optical-mechanical assemblies (Mi) in predefined positions distributed azimuthally around the axis of revolution (S).

9. The installation according to claim 8, wherein the adaptation fittings include a semi-circular rail (31) attached to one of the common frames with which interact a number of rollers (30) borne by each optical-mechanical assembly (Mi).

10. The installation according to claim 8, wherein the installation includes systems for locking (26-28, 27-29) each optical-mechanical assembly in a fixed position, in predefined positions distributed in a semi-circle on the first common frame and on the second common frame.

11. The installation according to claim 6, wherein the common frames (C1, C2) are mounted on a support jig (4) mounted movably along a direction parallel to the axis of revolution (S) of the containers.

12. The installation according to claim 1, wherein the optical systems (6*i*) are image-capturing optical systems each including at least one camera (7*i*) and at least one objective (8*i*), and connected to at least one image-processing unit.

13. The installation according to claim 12, wherein the installation includes an illumination source composed of illumination half-sources (9) disposed on either side of the translational travel path (D) for the containers, the illumination half-sources (9) being adjustable in relative separation and/or in height parallel to the axis of revolution.

14. The installation according to claim 12, wherein the image-capturing optical systems include at least twelve cameras (7*i*) distributed in such a way that twelve projections of the direct optical paths located in a plane perpendicular to the axis of revolution, have with respect to the direction of travel, azimuth angles, respectively between [15°; 30°], [50°; 60°], [60°; 75°], [105°; 120°], [120°; 130°], [150°; 165°], [195°; 210°], [230°; 240°], [240°; 255°], [285°; 300°], [300°; 310°], [300°; 345°].

15. An adjustment method for optical systems (6*i*), each with a work volume located at a work distance and each having an optical path all the way to a container section contained in the work volume of the optical system, observing or illuminating the container section bearing optical singularities on the surface or in the wall, each having an axis of revolution and travelling past in translation, the method comprising:
  making available the optical systems which for containers (2) possessing a section with a first diameter, have their respective work volumes each coincident with a part of said section having the first diameter, each of these work volumes being at a work distance which is fixed and remains invariable, the optical systems each possessing the optical path composed of at least one adjustment portion (PR); and
  during an adjusting phase for containers (2) possessing a section with a second diameter different to the first diameter, moving the optical systems (6*i*) in synchronous translation along a direction (Ti) parallel to the at least one adjustment portion (PR) of the respective optical paths of each optical system and as a function of the difference between the first diameter and the second diameter of the container section such that the optical systems keep their invariable respective work distances and such that their respective work volumes each be coincident with a part of said container section having the second diameter.

16. The method according to claim 15, wherein the optical systems (6*i*) are distributed azimuthally as a function of the diameter of the container section.

17. The method according to claim 15, according to which a number of optical systems (6*i*) is chosen as a function of the diameter of the container section.

18. The method according to claim 15, further comprising, after each phase of adjustment of the optical systems and in an image-capturing phase and for each container travelling past in translation:
  illuminating at least the container section to be inspected;
  taking, by the optical systems (6*i*), images covering the container section; and
  analyzing the images taken to at least identify at least one optical singularity present in the container section.

\* \* \* \* \*